United States Patent
Shoup

(10) Patent No.: US 10,188,038 B2
(45) Date of Patent: Jan. 29, 2019

(54) QUICK ATTACH CORN REEL ASSEMBLY

(71) Applicant: Kenneth E. Shoup, Kankakee, IL (US)

(72) Inventor: Kenneth E. Shoup, Kankakee, IL (US)

( * ) Notice: Subject to any disclaimer, the term of this patent is extended or adjusted under 35 U.S.C. 154(b) by 479 days.

(21) Appl. No.: 14/842,929

(22) Filed: Sep. 2, 2015

(65) Prior Publication Data
US 2017/0055453 A1   Mar. 2, 2017

(51) Int. Cl.
*A01D 45/02* (2006.01)
*A01D 57/02* (2006.01)

(52) U.S. Cl.
CPC ........... *A01D 57/02* (2013.01); *A01D 45/021* (2013.01)

(58) Field of Classification Search
CPC ...................................................... A01D 57/02
USPC ............. 56/16.1, 119, 220, 360, 400, 400.21
See application file for complete search history.

(56) References Cited

U.S. PATENT DOCUMENTS

| | | | | |
|---|---|---|---|---|
| 2,546,620 A * | 3/1951 | Van Ness | ............. | A01D 76/003 15/83 |
| 2,826,034 A * | 3/1958 | Feuerlein | ................ | A01D 57/01 56/238 |
| 3,360,912 A * | 1/1968 | Erdman | .................. | A01D 57/02 56/220 |
| 3,468,109 A * | 9/1969 | Reimer | .................. | A01D 57/02 24/605 |
| 3,481,125 A * | 12/1969 | Miller | .................... | A01D 80/02 56/400 |
| 3,742,687 A * | 7/1973 | Kalkwaf | ............... | A01D 45/021 56/106 |
| 4,901,511 A * | 2/1990 | Yarmashev | ............ | A01D 57/02 56/220 |
| 6,161,369 A * | 12/2000 | Monk | ..................... | A01G 1/125 56/400.03 |
| 6,199,358 B1 * | 3/2001 | Majkrzak | ............... | A01D 57/02 56/220 |
| 7,377,091 B2 * | 5/2008 | Shelton | ................ | A01D 45/021 56/119 |
| 2002/0073673 A1 * | 6/2002 | Gengenbach | ........ | A01D 45/021 56/119 |
| 2008/0282661 A1 * | 11/2008 | Gengenbach | ........ | A01D 45/021 56/119 |
| 2014/0075908 A1 * | 3/2014 | Surmann | .............. | A01D 45/021 56/119 |

* cited by examiner

*Primary Examiner* — Thomas B Will
*Assistant Examiner* — Mai T Nguyen
(74) *Attorney, Agent, or Firm* — Saul Ewing Arnstein & Lehr LLP

(57) ABSTRACT

A corn reel assembly that allows for quick connection and detachment from a corn reel is provided. The corn reel finger assembly may be quickly assembled and disassembled without the need for tools so that corn reel fingers may be connected or detached from mounts connected to a corn reel axle in the field. By allowing for rapid connection and disconnection of corn reel fingers from mounts, the corn reel fingers may be utilized only in those portions of the field requiring it. Enabling for the elongated fingers of the corn reel finger assembly to be detached from a mount attached to the corn reel axle without requiring disconnection of the mount from the corn reel axle also allows for more compact storage, as well as replacement of individual fingers if damaged, as opposed to replacement of an entire assembly. In some embodiments, adjustments to the particular angle of the fingers relative to the corn stalks being harvested can also be quickly made in the field.

15 Claims, 4 Drawing Sheets

Fig. 3
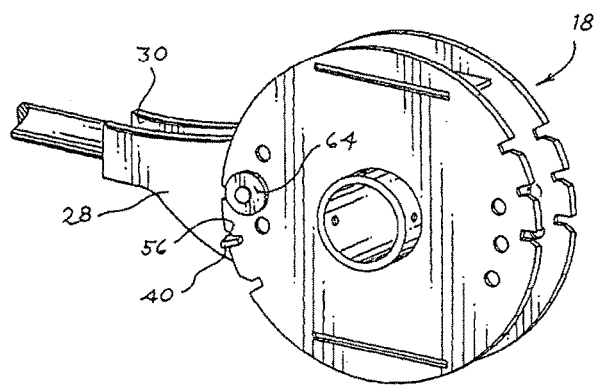
Fig. 4
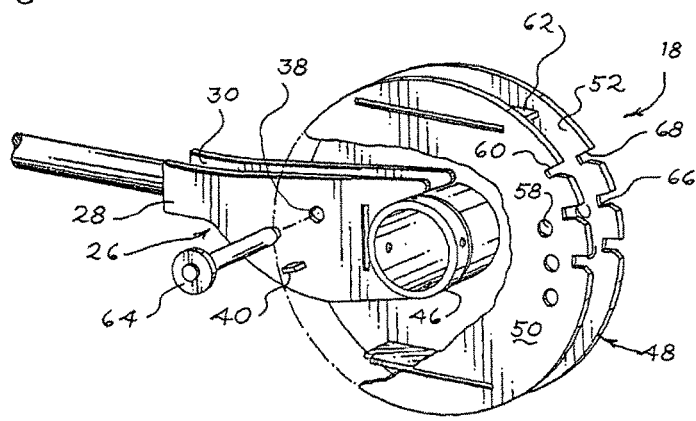
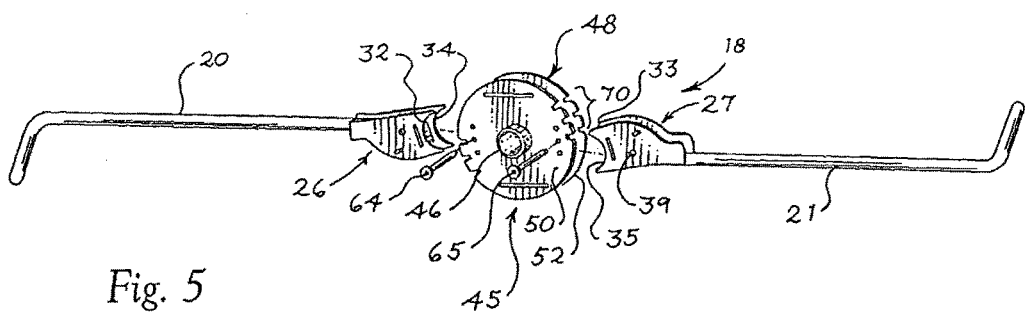
Fig. 5

QUICK ATTACH CORN REEL ASSEMBLY

FIELD OF THE INVENTION

The present invention pertains to a corn reel assembly that may be quickly attached or disconnected from a mount connected to a combine or other harvesting equipment.

BACKGROUND OF THE INVENTION

Storms, winds, and other factors sometimes down corn. When harvest comes, downed corn creates harvesting difficulties and may result in appreciable amounts of grain not being harvested. Corn reels, which are typically mounted on a corn head, have been used to address the problem. These corn reels utilize fingers mounted to a rotating corn reel axle to feed corn into the corn head, thereby lessening loss of product.

With conventional corn reels, the fingers, sometimes referred to as spokes, are connected to the corn reel axle by way of an integrally formed mount. For example, the fingers may be welded together with the mount. The mount is attached or secured to the corn reel axle by way of bolts, which require hand tools to tighten and assemble the corn reel. Similarly, in order to disconnect the fingers from the axle, this also requires hand tools. In some cases, farmers have welded fingers directly to the corn reel axle.

When a corn reel is attached to a corn head, the speed at which the corn head is operated must be reduced substantially, because of the extending fingers. Thus, it is desirable to utilize a corn reel only in those sections of a field that have downed corn. Accordingly, it is desirable to be able to quickly attach and detach the fingers from a corn reel while in the field without the need for tools. The quick detach fingers also allow for more compact storage of the fingers when not in use, and easier replacement of damaged fingers.

SUMMARY OF THE INVENTION

The present invention relates to a corn reel finger assembly that may be quickly assembled and disassembled without the need for tools so that corn reel fingers may be connected or detached from mounts connected to a corn reel axle. The corn reel finger assembly of the present invention may be quickly assembled or disassembled in the field, such that the corn reel fingers are only employed in those portions of the field requiring it. The present invention enables the elongated fingers of the corn reel finger assembly to be detached from a mount attached to the corn reel axle without requiring disconnection of the mount from the corn reel axle. By allowing for removal of the fingers without also having to remove the mount, more compact storage is possible. Moreover, the finger of the assembly can be replaced if damaged without requiring replacement of the other portions of the assembly. Also, in some embodiments, adjustments to the particular angle of the fingers relative to the corn stalks being harvested can be quickly made in the field.

In some embodiments, the corn reel finger assembly includes several components. For example, it may include an elongate finger having a first end portion and a second end portion and a yoke member positioned about the second end portion. The yoke may be connected to the end portion by connectors, such as bolts, or may be integrally formed with the finger, such as through welding. The yoke and finger may alternatively be unitarily formed, such as a cast or molded piece. The assembly may also include a pin member and a mount. The yoke member defines a recess at an end portion thereof and a pin receiving hole spaced from the recess, where the pin receiving hole is adapted to receive the pin member therein. In some embodiments, an additional tab may be formed on the yoke member. The tab is spaced from the pin receiving hole and the recess.

Separate from the finger is a mount. In some embodiments, the mount comprises a collar that is adapted to be connected with a corn reel axle, and a brace circumferentially formed around the collar, i.e., the brace surrounds the collar, albeit not necessarily in a circular manner as will be explained below. The brace may be connected to the collar by connectors, such as bolts, or may be integrally formed with the collar, such as through welding, or may be formed unitary with the collar such as by casting or molding. The collar may circumferentially engage and be secured with the corn reel axle in any manner known in the art. The brace includes a catch. The catch may be embodied in various forms such as a portion of the brace surrounding openings adapted to receive the pin member. In those embodiments that include a tab, there may also formed in the brace at least one aperture configured to receive the tab when the assembly is assembled.

When this embodiment is assembled, the second end portion of the yoke member, and particularly portion of the yoke member forming the recesses, engages the collar by seating a portion of the outer circumference of the collar within the recesses, which preferably has a matching outline to the outer radial surface of the collar. In a preferred embodiment, the collar has a circular outer radial surface, but could instead define a polygonal outer radial surface. The pin receiving hole of the yoke member and the catch of the brace are aligned, and the pin member is positioned within the pin receiving holes and engages the catch such that the yoke member and finger are in a locked relationship with the brace and the mount. In this embodiment, the portion of the yoke member surrounding the pin receiving holes forms a first base and the catch forms a second base, and the first and second bases are locked together by the pin member.

The relative positions of the tab on the yoke member and the at least one aperture on the brace are such that when the tab is seated in the aperture the pin receiving hole and catch are aligned. The additional tab and aperture arrangement may serve as an alignment aid because it is difficult to directly view and align the pin receiving holes of the yoke member and the catch of the brace when connecting the finger and yoke to the mount. The additional tab and aperture arrangement may also provide additional support for the finger.

While the mount in the above example comprises a collar and a brace, in other embodiments, the collar may not be included in the mount. Instead, the brace may be mounted directly to the corn reel axle, such as by welding. In this embodiment, the recesses of the yoke member may mate with the corn reel axle directly.

In some preferred versions of this embodiment, the yoke member is a monolithic piece. In other preferred embodiments, the yoke member comprises a pair of parallel opposed brackets. In such an embodiment, each of the opposed brackets may define a substantially arcuate recess at an end thereof and a pin receiving hole spaced from the recess where the arcuate recesses and the pin receiving holes of the opposed brackets are transversely aligned, and the opposed brackets are spaced a first distance apart from one another.

In some embodiments, the mount may comprise a brace formed from substantially planar members, such as a first disc and a second disc. The substantially planar members of this preferred brace may take on other configurations, including, but not limited to dog-bone shaped, oval, and polygonal. Reference is made to the embodiment where the brace is formed of pair of discs by way of example. The first disc may include a catch adapted to engage the pin member when the assembly is assembled, and the second disc may also include a catch that also engages the pin member. In one example, the catches are in the form of the portions of the first and second discs defining pin receiving openings, which will engage the pin member passed therethrough. In some embodiments, the brace of the mount may include a plurality of catches that allow a user to select where on the brace the finger and yoke are to be mounted. In this case, it is further preferred that the brace define multiple apertures that are configured to receive the tab. When the brace comprises a pair of substantially planar members, such as a first disc and a second disc, the first disc and the second disc are preferably spaced a second distance, where the first distance between the brackets of the yoke member are less than the second distance spacing of the first and second discs.

In an alternate embodiment of the present invention, the assembly may include an elongate finger having a first end portion and a second end portion, a yoke member, and a mount comprising a collar and a brace. The yoke member is positioned about the second end portion of the elongate finger. The yoke member defines a recess at an end portion thereof and may include a detent member forming a first base, such as a protrusion, tab, or cross bar. Adapted to be mounted with a corn reel axle is the mount with its collar and brace circumferentially formed around the collar. As discussed, the shape of the brace may be other shapes such as oval, dog-bone shaped, etc. The recesses of the yoke are sized and shaped so as to mate with the collar. The brace defines a second base that may be a recess or a notch in which the yoke member detent may be positioned. The detent may be secured within the notch by way of a retractable latch. For example, the latch may take the form of a sliding, spring biased mechanism that is held in a closed position by a spring, and then can be manually slid back to allow the yoke member to be attached to or detached from the mount. As with the previous embodiment, it may be preferred that the yoke comprise a first bracket and a second bracket spaced a first distance, and the brace of the mount comprise a pair of substantially planar members, such as a first disc and a second disc, which are spaced a second distance, the first distance being less than the first distance. In some embodiments, the brace may define a plurality of notches or apertures configured to receive the yoke member detent.

As should be apparent, the corn reel axle defines a corn reel central axis. The mount is attached to the corn reel axle about the central axis. The finger also defines an axis, which may be referred to as a finger axis. When the corn reel finger assembly is assembled, the finger axis extends substantially perpendicular to the corn reel central axis. In the above examples, the recesses of the yoke member are disposed about the corn reel central axis when the corn reel finger assembly is assembled.

In another embodiment, the finger and yoke are connected with the mount in an alternative manner. As with the other examples, when the corn reel finger assembly is assembled, the finger axis extends substantially perpendicular to the corn reel central axis. However, in this alternative embodiment, the yoke member recesses are not disposed about the corn reel central axis when the corn reel finger assembly is assembled. Rather, the mount further includes an anchor formed with the brace, such as a cross bar. The cross bar is positioned parallel but nonconcentric with the corn reel central axis. The yoke member recesses are mated with the anchor when assembled.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis, for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 3 is an enlarged perspective view of the corn reel finger assembly of FIG. 2 in an assembled form;

FIG. 4 is an enlarged perspective partial view of the corn reel finger assembly of FIGS. 1-3 in an assembled form with a portion cut away to show interior detail;

FIG. 5 is a perspective view of the corn reel finger assembly of FIGS. 1-4 with a second finger attached;

Figure 1:
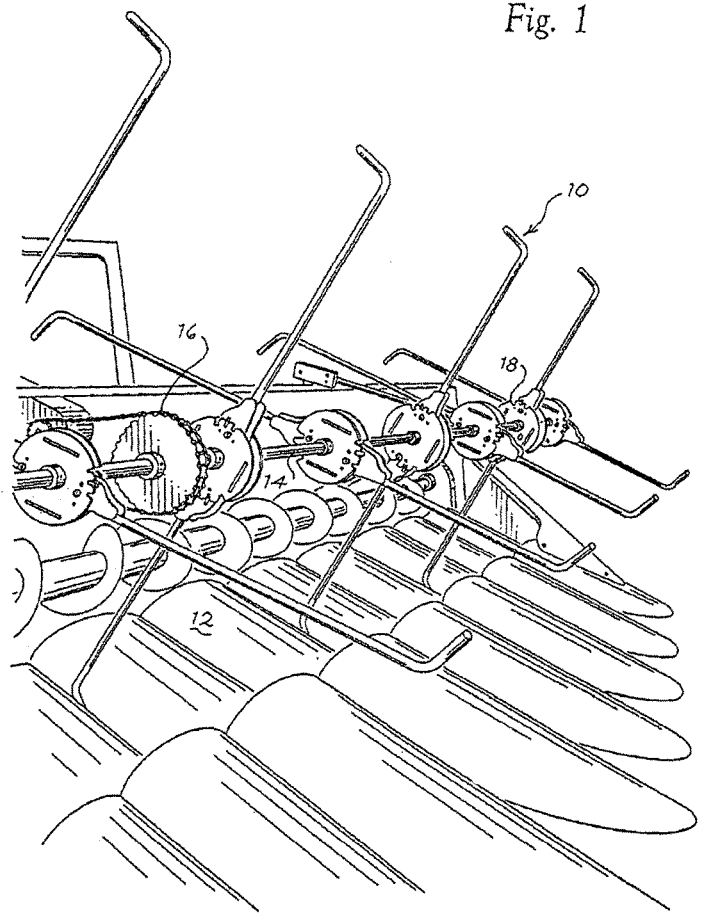
FIG. 1 is perspective view of a corn reel including an preferred embodiment of the corn reel finger assembly according to the present invention.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the use of the accompanying drawings. In the drawings, like numbering represents like elements between the drawings.

DETAILED DESCRIPTION OF PREFERRED EMBODIMENTS OF THE INVENTION

There is shown in FIG. 1 a corn reel, including a corn reel assembly according to a preferred embodiment of the present invention. The corn reel 10 is shown generally mounted to a combine over a corn head 12. The corn reel 10 includes a corn reel axle 14 upon which is mounted a corn reel hub 16. Corn reel hub 16 is rotated by any means known in the art, such as a chain drive. Also attached to the corn reel axle 14 are a plurality of corn reel assemblies 18, which are discussed in greater detail below. In this embodiment, pairs of fingers are depicted. However, in some instances, such as with interior portions of the corn reel, only a single finger may be necessary, while on the outside portions of the corn reel a pair of fingers is preferred.

Figure 2:
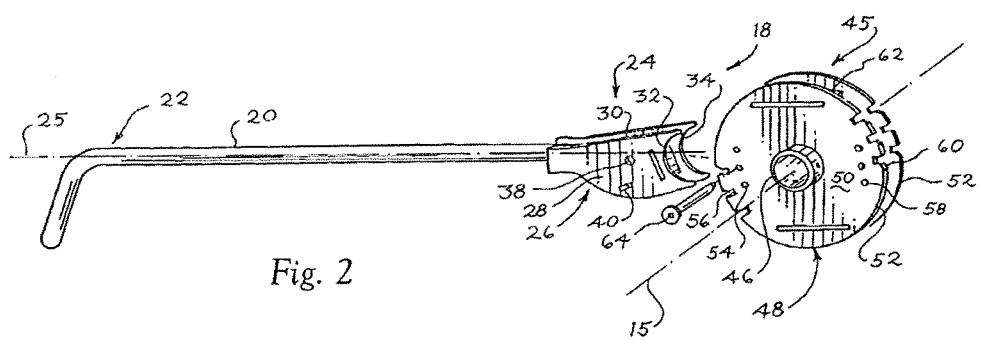
FIG. 2 is an enlarged perspective view of a preferred embodiment of the corn reel finger assembly in a disassembled form.

Referring to FIG. 2 there is depicted an enlarged perspective view of a preferred embodiment of a corn reel finger assembly 18 in a disassembled form according to a preferred embodiment of the invention. A corn reel finger 20 is provided, which generally defines a first end portion 22, a second end portion 24, and generally extends along a finger axis 25. In this embodiment, the finger 20 is an elongated member, but may take other configurations as desired. Positioned at the second end portion 24 of the finger 20 is a yoke member 26. In this preferred embodiment, the yoke 26 comprises a first bracket 28 and a second bracket 30. The first bracket 28 and second bracket 30 may be connected to the second end portion 24 by way of connectors, such as bolts, or may be welded to the second end portion to form an integral structure, or may be unitarily formed as a single piece. The first bracket 28 defines a first recess 32. In this embodiment the first recess is of a generally arcuate shape that opens away from the first end portion 22. The first bracket 28 also defines a pin receiving hole 38. As shown, the pin receiving hole 38 is spaced a distance from the recess. The pin receiving hole 38 is also sized to receive pin 64 therethrough. In order to prevent the pin from disengaging unintentionally, the pin may include a catch or stop (not shown) as is known in the art. In order to prevent loss of the pin when not installed, it may also be tethered to the yoke (not shown).

In this embodiment, the first bracket 28 also has formed thereon a tab 40. Although in this view, several of the features of the second bracket 30 are not visible, it is in large part a mirror image of the first bracket 28. As shown, second bracket 30 also defines a generally arcuate second recess 34 that opens away from the first end portion 22. First bracket 28 and second bracket 30 are positioned in a generally parallel relationship a first distance apart.

While the yoke 26 is shown in this embodiment as comprising two brackets, this is only a preferred form. For example, the yoke may be a monolithic member with the recess and pin receiving holes formed therein. Alternatively, the yoke may comprise multiple components assembled together.

The mount 45, in this embodiment, comprises a collar 46, which is configured to fit over a corn reel axle 14 (FIG. 1). Although the corn reel axle 14 is not depicted in FIG. 2, it should be understood that the corn reel axle defines a corn reel central axis 15. The collar 46 may be secured to the corn reel axle by any means known in the art. Formed circumferentially around the collar 46 is a brace 48. In this preferred embodiment, brace 48 comprises a first substantially planar member, such as first disc 50, and a second substantially planar member such as second disc 52. First disc 50 and second disc 52 are positioned generally parallel to one another. While in this preferred embodiment the brace 48 comprises generally circular first and second discs, 50 and 52, the particular shape of the brace need not be circular. Rather, in place of discs, the brace could comprise a pair of substantially planar members of other shapes such as oval, dog-bone, rectangular, etc.

With regard to this preferred embodiment, various features of first disc 50 are discussed, and it should be understood that such features are also found with second disc 52. First disc 50 defines a plurality of catches, which are defined by the portion of the first disc 50 defining hole 54. First disc 50 further defines a plurality of apertures, such as aperture 56. First disc 50 and second disc 52 may be connected by a support 62. The plurality of catches and apertures can be spaced radially as desired to provide different circumferential locations where the yoke member may be attached. In so doing, the particular angle at which the finger engages the corn stalks can be adjusted to be more aggressive or relaxed. By allowing the fingers to be quickly detached and reattached at a different angle in the field without the need for tools, adjustments can be made as conditions warrant.

Although not depicted, it should be understood that the radially outer surface of the collar may include a plurality of facets or have a non-circular shape. In such an embodiment, it would be preferred that the recesses of the yoke would define a complementary outline to the collar. Such facets or non-circular shape may provide the means for aligning the pin receiving hole and the catch.

Regardless of the particular outline of the collar or the corn reel axle, the yoke member recesses preferably surround less than half of the outer radial surface of the collar so as to allow for multiple fingers to be attached to the mount. In such an embodiment, two sets of catches and apertures may be provided approximately 180 degrees apart. This allows for a pair of fingers to be mounted, if desired. First disc 50 and second disc 52, as depicted in this embodiment, are spaced a second distance that is greater than the first distance separating the first bracket 28 and the second bracket 30. It is preferred that the difference between the first distance and the second distance be such that the portion of yoke 26 that will engage the mount may be easily guided between first disc 50 and the second disc 52, but not so large that there is substantial freedom for lateral movement of the yoke between the first and second discs.

Referring to FIG. 3, a preferred embodiment of the corn reel finger assembly 18 is shown in an assembled form. Pin 64 is inserted through hole 54 (FIG. 2) of first disc 50. Although not visible in this view, pin 64 is also guided through pin receiving hole 36 of first bracket 28, as well as a second pin receiving hole of second bracket 30. Tab 40 is also positioned within aperture 56.

In this example, the tab 40 and aperture 56 provide an alignment aid. It is often the case that a user would not be able to view directly the holes in the brackets and those in the mount, and therefore would be difficult to align the holes and insert the pin member. In order the more easily align the holes, aperture 56 includes a relatively wide opening that guides tab 40 to a narrower seat. When tab 40 is seated within aperture 56, the holes will be aligned. As such, user will be able to align the holes by way of tactile feedback and insert the pin without needing to directly view the holes. Tab 40 nested within aperture 56 may also provide additional torsional stability.

Shown in FIG. 4, the assembled form is more easily seen. In the assembled form of corn reel finger assembly 18, the yoke 26, and particularly the first bracket 28 and second bracket 30 are positioned between first disc 50 and second disc 52. Collar 46 is mated with first recess 32 and second recess 34 (FIG. 2). First recess 32 and second recess are positioned about corn reel central axis 15, and finger axis 25 is substantially perpendicular to and extends radially from central axis 15. Pin 64 is guided through hole 54 (FIG. 2), as well as pin receiving hole 38 of first bracket 28, the second pin receiving hole of second bracket 30, and a hole (not visible) defined by a second disc detent, e.g., a portion of the second disc surrounding the hole.

First and second discs 50 and 52 further define a second set of detents, such as the portion of the disc surrounding hole 58 in the first disc and the portion of the second disc defining hole 66. First and second discs 50 and 52 also further define a second set of apertures, such as aperture 60 and aperture 68. In some applications, it may be desirable to have a pair of corn reel fingers positioned approximately 180 degrees apart such as shown in FIG. 5. In this embodiment, finger 20 and finger 21 are to be attached with collar 46 and brace 48. The second set of detents allows for a second finger 21 to also be attached to the mount. In this preferred embodiment, the recesses 32 and 34 of yoke 26 encircle less than half of the outer circumference of collar 46, and recesses 33 and 35 of second yoke 27 will surround a similar but opposed portion of the outer circumference of collar 46, and thereby will operatively engage the corn reel axle. Second pin member 65 is guided through one of the holes 58 defined by the second set of detents and pin receiving hole 39 to secure the yoke member 27 to the mount 48. Although not shown, operative engagement between the yoke member recesses and the corn reel axle may be in the manner of direct engagement therebetween.

It should be understood that different shaped recesses for the yoke may be utilized, for example, to accommodate different shaped outer radial surfaces for the corn reel collars. For example, a collar with a hexagonal radial outer surface may be used. The yoke would define an outline to mate with the outer surface. The hexagonal, or other polygonal, shape may also provide a way for tactile alignment of the finger and the mount.

Figure 6:
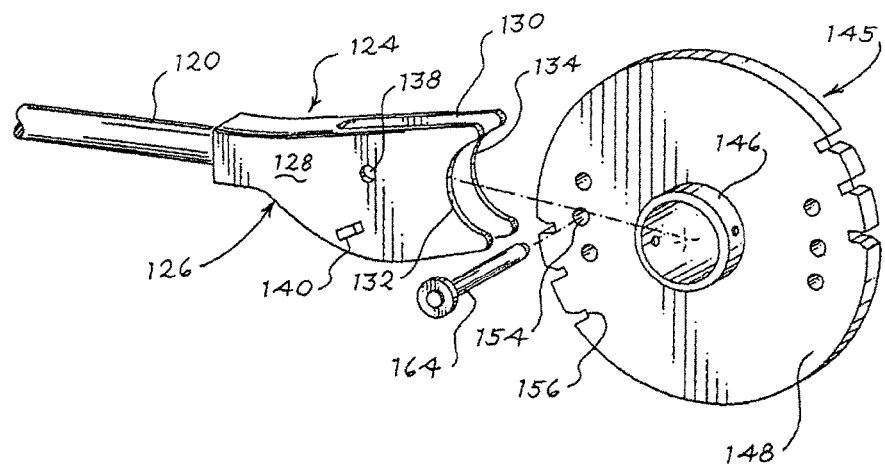
FIG. 6 is an enlarged perspective view of an alternative embodiment of a corn reel finger assembly in a disassembled form.

An alternative embodiment is described with reference to FIG. 6. Corn reel assembly 118 includes a finger 120 defining a first end portion (not shown) and a second end portion 124. Formed about the second end portion 124 is yoke member 126 comprising first bracket 128 and second bracket 130. First bracket 128 and second bracket 130 each define a recess 132, 134, respectively, formed at a second end. Each of first bracket 128 and second bracket 130 each define a pin receiving hole, such as hole 138. Mount 145 is adapted to connect to an axle (not shown). In particular, collar 146 of mount 145 engages the axle. Brace 148 is formed about the collar 146. In this embodiment, brace 148 comprises a single disc having at least one catch 154 and a notch 156. The spacing of brackets 128 and 130 is greater than the thickness of disc 148 such that the disc 148 is sandwiched between the brackets when corn reel assembly 118 is assembled. It is preferred that the spacing of the brackets is not so much greater than the thickness of disc 148 so as to allow more than minimal amounts of lateral movement. As with previous embodiments, brace 148 defines several catches and notches to enable the finger 120 to be mounted at different angles, and yet other catches and notches to allow for a second finger to be attached.

Figure 7:
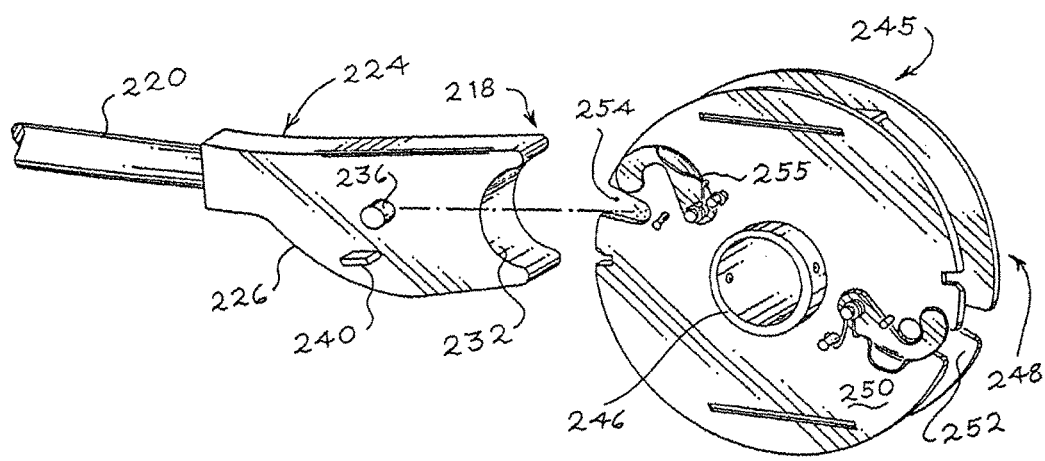
FIG. 7 is an enlarged perspective view of another alternative embodiment of a corn reel finger assembly in a disassembled form.

Another alternative embodiment is described with reference to FIG. 7. The corn reel finger assembly 218 in this embodiment comprises an elongate finger 220 having a first end portion (not shown) and a second end portion 224. The assembly 218 further comprises a yoke member 226, the yoke being positioned about the second end portion 224 of the elongate finger 220. As with the previous embodiment, the yoke member 226 defines a substantially arcuate recess 232 at an end portion thereof. The yoke member further includes a detent 236. This detent, as shown is an extending protrusion. In FIG. 7, the yoke member 226 is depicted as a monolithic piece. It should be understood, however, that yoke member 226 may include a pair of brackets similar to depicted in FIG. 2.

As with the previous embodiment, a mount 245 is provided. Mount 245 includes a collar 246 that is adapted to engage with a corn reel axle (not shown), and which is configured to fit within the recess 232 of the yoke member 226. It should be understood that while in the embodiments shown, the recess generally defines a semi-circular outline, this particular configuration is just a preferred embodiment that enables a pair of fingers to be secured to a single mount as discussed with respect to FIG. 5.

A brace 248 is circumferentially formed about the collar 246. The brace 248 defines a notch 254 adapted to receive the yoke member detent 236. In order to lock in yoke 226, the brace 248 further includes a releasable latch 255. In this embodiment, latch 255 is depicted as a gate that may be slid over the notch 254 so as to secure the yoke 226 relative to the mount 248. The latch 255 may be biased by a spring to be in a locked position, and may be released by a user and slid out of the way when removing the yoke from the mount, or when installing the yoke with the mount. Latch 255 is depicted as an example, however, and a variety of latches that may engage detent 236 may be utilized. Although not visible, it may be preferred to include a second latch, such as on second disc 252 that couples with a second detent (not shown) on the yoke 226. For example, in an embodiment where the yoke member comprises a pair of opposed brackets, such as in FIG. 2, the detent may take the form of a cross bar that extends between and through the brackets. A tab 240 that mates with one or more apertures 256 may also be included to provide additional torsional stability.

When in an assembled form, the assembly 218 will be similar to that depicted in FIG. 3, except that instead of a pin member being positioned within pin receiving holes and engaging a detent, a tab member is held in place in notch 254 by latch 255. As with the previous embodiment, if desired, a pair of fingers may be attached to mount 248.

Figure 8:
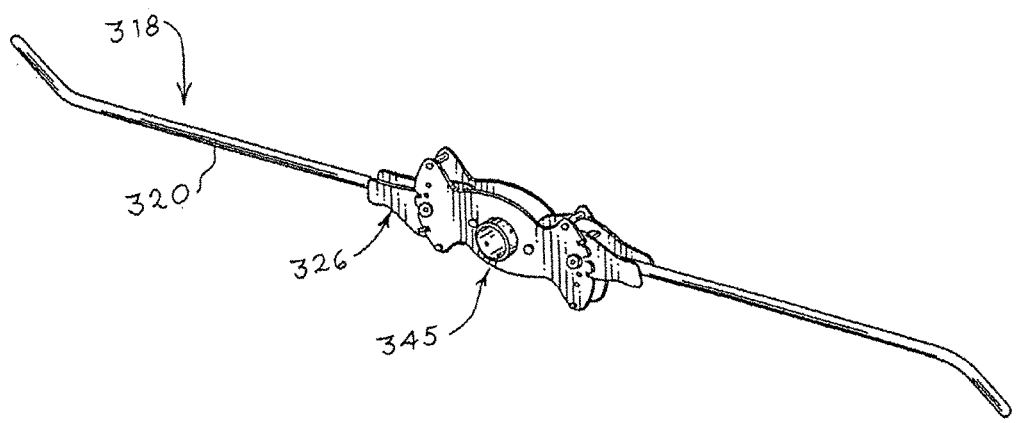
FIG. 8 is an enlarged perspective view of another alternative of a corn reel finger assembly.
Figure 9:
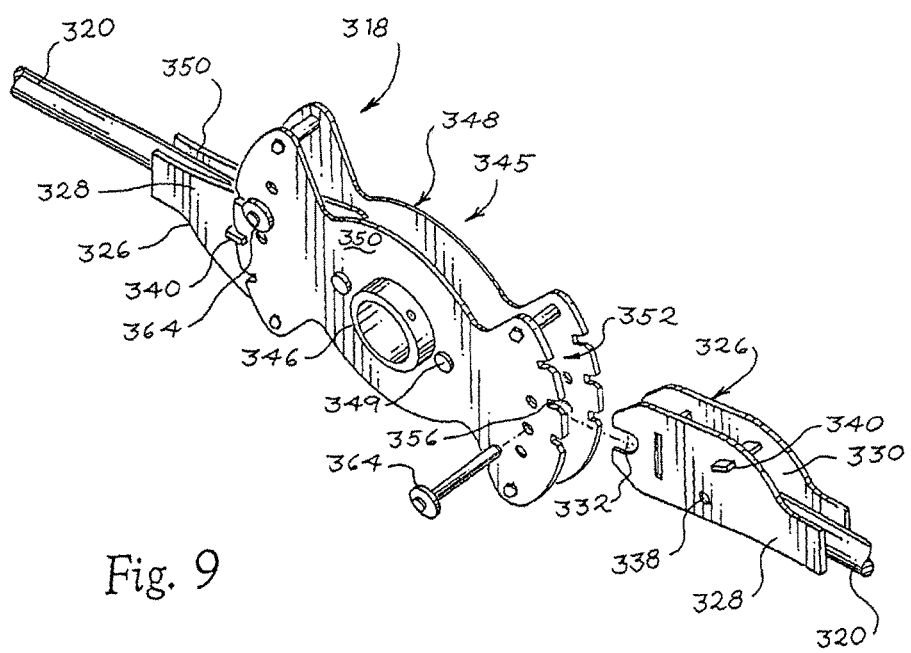
FIG. 9 is an enlarged partially disassembled perspective view of the embodiment of FIG. 8.

Referring to FIGS. 8 and 9, an alternative embodiment that illustrates a different engagement between a yoke member and a mount. Assembly 318 comprises a finger 320 having a first end 322 and a second end 324. Disposed about the second end 324 of the finger 320 is a yoke member 326. Yoke member 326 includes a first bracket 328 and a second bracket 330. Formed at the end of each of first bracket 328 and second bracket 330 are recesses, such as recess 332. Each of first bracket 328 and second bracket 330 further define pin receiving holes, such as hole 338, which is spaced from recess 332. Each of first bracket 328 and second bracket 330 further define a tab, such as tab 340, which is spaced from recess 332 and hole 338.

Disposable about a corn reel axle central axis 315 is mount 345. Mount 345 comprises a collar 346 and brace 348, which comprises a pair of substantially parallel members 350 and 352. Brace 348 further includes an anchor, such as cross bar 349. Cross bar 349 and recess 332 of the first bracket 328 and the recess (not shown) of the second bracket 330 are preferably complementary to one another such that cross bar 349 is seated within the recesses when assembled. Pin member 364 is inserted through catch 354 and pin receiving holes 338 to lock the finger 320 and yoke member 326 with mount 345. As shown, in this particular embodiment, the brace 348 and its parallel members 350 and 352 are "dog-bone" shaped. Also, as with previous embodiments, a second finger may be attached opposite the first finger, which may also be used with previous embodiments.

While a presently preferred embodiment of the present invention has been shown and described, it will be apparent that modifications may be made without departing from the scope of the invention as defined in the attached claims.

I claim:

1. A corn reel finger assembly attachable to a corn reel axle, the assembly comprising:
   an elongate finger defining a finger axis and having a first end portion and a second end portion, and a yoke member;
   a pin member,
   the yoke member being positioned about the second end portion of the elongate finger, the yoke member defining at least one recess at an end portion of the yoke member and a pin receiving hole spaced from the recess and adapted to receive the pin member therethrough;
   a mount adapted to engage with the corn reel axle, the mount including a brace having at least one catch adapted to engage the pin member, the mount further comprising a collar adapted to engage with the corn reel axle and configured to fit within the recess, and when assembled the yoke member recess is mated with a portion of an outer radial surface of the collar; and
   when in an assembled form, the pin member is positioned within the pin receiving hole and engages the catch, and the second end portion of the finger is stationary relative to the corn reel axle.

2. The assembly of claim 1 wherein the yoke member further comprises a tab spaced from the recess and the pin receiving hole, and where the brace further defines an aperture configured to receive the tab when the assembly is in the assembled form.

3. The assembly of claim 1, further comprising:
   a second elongate finger having a first end portion, a second end portion, and a second yoke member;
   a second pin member; and
   the second yoke member being positioned about the second end portion of the second elongate finger, the second yoke member defining at least one recess at an end portion of the second yoke member and a pin receiving hole spaced from the recess and adapted to receive the second pin member therethrough; and
   when assembled, the second elongate finger extends in a direction opposite from the elongate finger.

4. The assembly of claim 1, the yoke member comprising a pair of parallel opposed brackets, each of the opposed brackets comprising a recess, and a pin receiving hole spaced from the recess.

5. The assembly of claim 1, the brace comprising a first substantially planar member and a second substantially planar member, the first substantially planar member including a first catch adapted to engage the pin member, the second substantially planar member including a second catch adapted to engage the pin member; and when in an assembled form, the pin member engages the first and second catches.

6. The assembly of claim 5, the first substantially planar member comprising a plurality of apertures, each aperture configured to receive a tab, the first substantially planar member further comprising a plurality of catches, each catch adapted to engage the pin member, the second substantially planar member further comprising a plurality of catches, each catch adapted to engage the pin member, and when in an assembled form, the pin member engages one of the plurality of catches in the first substantially planar member and one of the plurality of catches in the second substantially planar member.

7. The assembly of claim 5, the first catch comprising a portion of the first substantially planar member defining a first pin receiving hole, the second catch comprising a portion of the second substantially planar member defining a second pin receiving hole.

8. A corn reel finger assembly comprising:
   an elongate finger having a first end portion, a second end portion, and a yoke member;
   a pin member;
   the yoke member comprising a first and a second bracket,
     the first bracket being positioned substantially parallel to the second bracket, the first bracket and the second bracket located about the second end portion of the elongate finger, the first bracket having a second end defining a first recess, a first pin receiving hole spaced from the first recess and adapted to receive the pin member therethrough, and,
     the second bracket having a second end defining a second recess, a second pin receiving hole spaced from the second recess and adapted to receive the pin member therethrough, the first recess transversely aligned with the second recess and the first pin receiving hole transversely aligned with the second pin receiving hole;
   a mount adapted to engage with the corn reel axle, the mount including an engagement portion configured to be seated within the first recess and the second recess, the first recess and the second recess each substantially extending around at least a portion of the outer radial surface of the engagement portion;
   the mount further defining a brace, the brace defining at least one catch adapted to engage the pin member; and
   when in an assembled form, the engagement portion is mated with the first and second recess, the pin member is positioned within the first and second pin receiving holes and engages the catch, and one of the first tab or the second tab is positioned within the aperture.

9. The assembly of claim 8, the engagement portion comprising a collar adapted to engage the corn reel axle.

10. The assembly of claim 8, the brace comprising a first substantially planar member and a second substantially planar member.

11. The assembly of claim 10, the yoke member comprising a tab spaced from the first recess and the first pin receiving hole, the first substantially planar member including a first aperture configured to receive the first tab; and
   when in an assembled form, the pin member engages the first catch, and the first tab is positioned within the first aperture.

12. The assembly of claim 8, wherein the catch comprises a portion of the mount defining an opening.

13. A corn reel finger assembly attachable to a corn reel axle, the assembly comprising:
   an elongate finger having a first end portion, a second end portion, and a yoke member;
   the yoke member comprising a first bracket and a second bracket, the first bracket being positioned substantially parallel to the second bracket, the first bracket and the second bracket located about the second end portion of the elongate finger, the first bracket having a second end defining a first recess, the second bracket having a second end defining a second recess, the first recess transversely aligned with the second recess;
   a mount adapted to engage with a corn reel axle, the mount comprising an engagement portion configured to mate with the first recess and the second recess, the mount further comprising a brace;

a coupling assembly comprising:
- a first base member formed with the yoke member;
- a second base member formed with the brace;
- a lock adapted to engage the first base member and the second base member; and when in an assembled form, the engagement portion of the mount is positioned within the first and second recess, the lock is engaged with the first base member and the second base member.

14. The assembly of claim 13, the first base member comprising a portion of the yoke member defining at least one pin receiving hole, the second base member comprising a catch formed with the brace, and the lock comprising a pin member.

15. A corn reel finger assembly attachable to a corn reel axle, the assembly comprising:
- an elongate finger defining a finger axis and having a first end portion and a second end portion, and a yoke member;
- a pin member;
- the yoke member being positioned about the second end portion of the elongate finger, the yoke member defining at least one recess at an end portion of the yoke member and a pin receiving hole spaced from the recess and adapted to receive the pin member therethrough;
- a mount adapted to engage with the corn reel axle, the mount including a brace having at least one catch adapted to engage the pin member; and when in an assembled form, the pin member is positioned within the pin receiving hole and engages the catch, and the second end portion of the finger is stationary relative to the corn reel axle, and the pin member is removable from the pin receiving hole without the use of tools.

* * * * *